A. V. GULLBORG.
LUBRICATING APPARATUS.
APPLICATION FILED APR. 21, 1919.
1,316,714.
Patented Sept. 23, 1919.
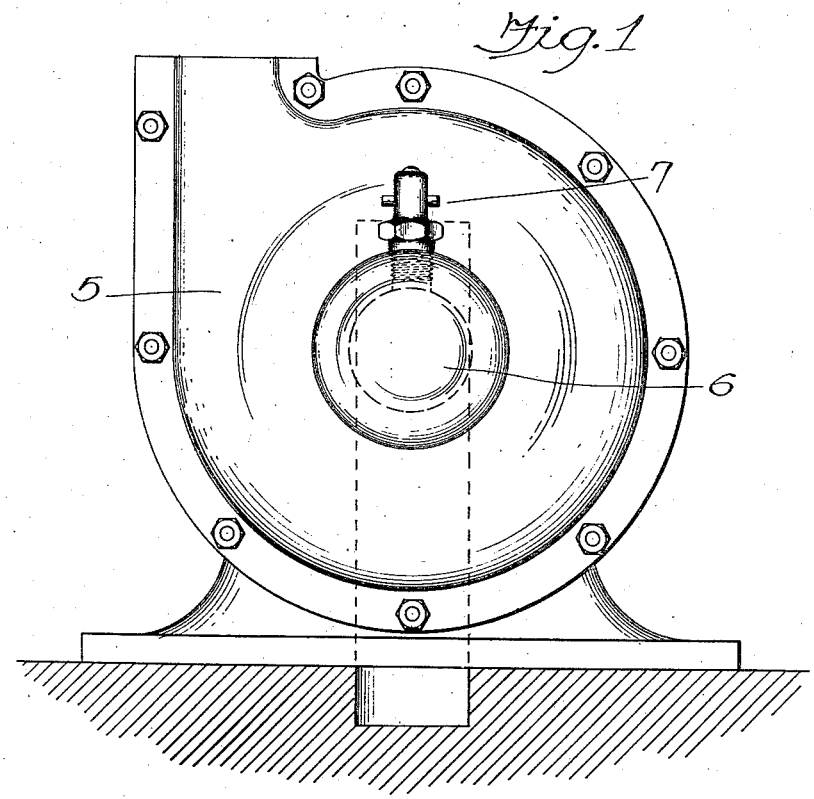
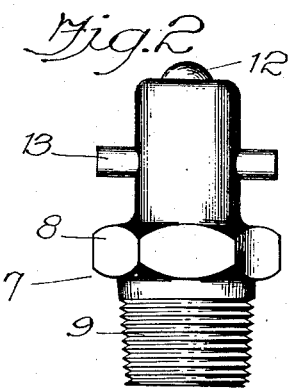
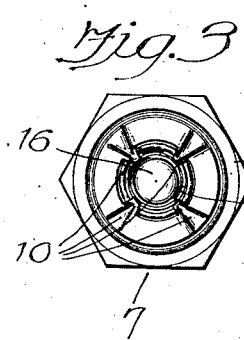
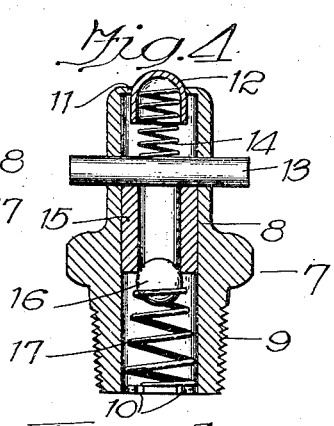

UNITED STATES PATENT OFFICE.

ARTHUR V. GULLBORG, OF CHICAGO, ILLINOIS.

LUBRICATING APPARATUS.

1,316,714. Specification of Letters Patent. Patented Sept. 23, 1919.

Application filed April 21, 1919. Serial No. 291,778.

*To all whom it may concern:*

Be it known that I, ARTHUR V. GULLBORG, a citizen of the United States, residing at Chicago, in the county of Cook and State of Illinois, have invented a certain new and useful Improvement in Lubricating Apparatus, of which the following is a full, clear, concise, and exact description, reference being had to the accompanying drawings, forming a part of this specification.

My invention relates to improvements in lubricating apparatus, and is especially concerned with improvements in that type of apparatus disclosed in my copending applications Serial Nos. 216,586, and 267,858, filed February 11, 1918 and February 21, 1918 respectively.

In my above mentioned application I have disclosed means for supplying lubricant to bearings and other surfaces to be lubricated, comprising a tubular coupling member adapted to be secured to a bearing, a grease gun having a discharge conduit provided with a coupling member, the two coupling members being provided with co-acting means whereby they can be detachably connected in such a manner that lubricant under high pressure can be forced through the coupling member secured to the bearing, and into the bearing to be lubricated. The coupling members which are secured to the bearings are provided with spring pressed closures which automatically close when the grease gun is detached from the coupling members, and thus prevent the entry of dirt and dust into the coupling members, and likewise prevent the escape of lubricant therefrom. In making these devices in commercial quantities, it sometimes happens that the closures for the coupling members do not form an absolute seal, and I have found that when these coupling members are used upon water pumps of the centrifugal type wherein there is a slight back pressure of perhaps several pounds per square inch upon the lubricant in the bearings for the rotary element of the pump, the back pressure is sufficient to discharge the lubricant through the coupling members and past the spring pressed closures, and especially is this true where the pumps are used for pumping hot water, the temperature of which is sufficient to render the lubricant in the coupling members more or less fluid.

The objects of my invention are:

First: To provide a coupling member of such construction as to overcome the above difficulties;

Second: To provide a coupling member having means for relieving the pressure exerted upon the closure member;

Third: To provide a coupling member embodying a pair of closures spaced apart and so arranged as to trap a body of lubricant between them, which will tend to resist the passage of fluids other than the lubricant through the coupling members; and Fourth: To provide means of the character described, which is simple in construction and economical to manufacture.

Other objects will appear as this description progresses, reference being had to the accompanying drawings, in which—

Figure 1 is an end elevation of a centrifugal pump, the end bearing of which is shown as being provided with one of my improved couplings;

Fig. 2 is a side elevation of my improved coupling;

Fig. 3 is an end elevation of the end of the coupling adapted to be secured to a bearing; and Fig. 4 is a central longitudinal section through my coupling.

Referring to the drawings, the reference character 5 indicates as a whole a centrifugal pump having an end bearing 6. This bearing is, as shown, provided with one of my coupling members, which will be indicated as a whole by the reference character 7. This coupling member comprises a tubular member 8, one end of which is provided with external screwthreads, as shown at 9. This end is also swaged inwardly at intervals, to provide a plurality of lugs or projections 10, the function of which will be referred to later on. The opposite end of the tubular member is flanged inwardly, as shown at 11, to provide a seat for the capsule shaped closure 12. A pin 13 extends through the walls of the tubular member, and both ends thereof project beyond the walls of the tubular member to provide means for co-acting with a bayonet slot in the coupling member, secured to the end of the discharge conduit of a grease gun, such as that disclosed in my copending applications above referred to, to connect the grease gun and the coupling member in fluid tight relation, so that lubricant can be supplied to the coupling member under extremely high pressure. A compression spring 14 is confined between the closure 12 and the pin 13, and serves yieldingly to hold the closure 12 in its closing position. A sleeve 15 is forced into the tubular member 13 and the end thereof remote from the closure 12 provides a seat for the ball closure 16, which is yieldingly held in closing position by compression spring 17, which is interposed between the closure 16 and the lugs 10 referred to above.

The lubricant in the end bearings of a centrifugal pump such as that above referred to are usually subjected to a pressure of several pounds, which, as stated above, tends to force the lubricant from the bearings. When a pump is equipped with coupling members such as that described above, for supplying lubricant to the bearings, the closure 16 absorbs the greater part of the back pressure, and even though it does not absolutely seal the coupling member against the passage of lubricant therethrough, it does reduce the back pressure to such an extent that the pressure is insufficient to force lubricant past the closure 12. Furthermore, the closure 16 acts to trap a body of lubricant between it and the closure 12, which acts as a seal to prevent the escape of water or any other fluid which may be pumped by the pump past the closure 12.

It sometimes happens that the outer closures 12, or their seats 11, are subjected to accidental blows, which deform them to such an extent that they do not form a fluid tight contact, but still serve to prevent the entrance of dirt and dust into the coupling members. Under these circumstances the inner closure 16 will absorb all, or substantially all, of the back pressure of the fluid being pumped by the pump, and will prevent an excessive flow of fluid through the bearing.

I have described the end of the spring 17 remote from the closure 16 as being supported by lugs 10. My purpose in providing a plurality of spaced lugs rather than simply flanging the lower end of the tubular member inwardly throughout its entire circumference, is to provide passages between the bottom coils of the spring and the walls of the tubular member, which will permit the passage of lubricant when the convolutions of the spring 17 are pushed together by the force exerted on the closure 16 when lubricant is being supplied to the coupling member by the grease gun. It will readily be seen that when the spring is completely compressed no lubricant can pass between the convolutions thereof, and inasmuch as the closure 16 seals the upper end of the spring, it is necessary to provide some place for the lubricant to pass around the outer sides of the spring and into the bearing. It is of course possible to provide a spring which will not be compressed to such an extent that the adjacent convolutions touch each other. With such a spring it would not be necessary to provide the specific construction which I have described for supporting the lower end of the spring 17.

While I have described the details of the preferred embodiment of my invention, it is to be clearly understood that my invention is not to be limited to these details, but is capable of other adaptations and modifications within the scope of the appended claims.

Having thus described my invention, what I claim is:

1. The combination with a bearing subjected to liquid pressure, of means for conducting lubricant to said bearing, comprising a hollow member, a spring pressed closure for said hollow member, means for relieving said closure from pressure, comprising a spring pressed member located between said bearing and closure, and co-acting with said hollow member, to resist flow of lubricant toward said closure and means for detachably securing the discharge conduit of a grease gun to said hollow member to force lubricant past said closure.

2. The combination with a bearing subjected to liquid pressure, of means for conducting lubricant to said bearing, comprising a hollow member, a closure for said hollow member, means for relieving said closure from pressure, comprising a member located between said bearing and closure, and co-acting with said hollow member, to resist flow of lubricant toward said closure and means for detachably securing the discharge conduit of a grease gun to said hollow member to force lubricant past said closure.

3. The combination with a tubular member having one end flanged inwardly to form a closure seat, and the other end swaged inwardly at a plurality of points, to form a plurality of supporting lugs, of a closure for said seat, a spring for yieldingly holding said closure in closing position, a sleeve mounted in said tubular member, the end of said sleeve remote from said closure forming a second closure seat, a second closure for said second seat, and a spring confined between said second closure and said supporting lugs for yieldingly holding said second closure on its seat.

4. The combination with a tubular member having one end flanged inwardly to form a closure seat, of a closure for said seat, a spring for yieldingly holding said closure in closing position, a sleeve mounted in said tubular member, the end of said sleeve remote from said closure forming a second closure seat, a second closure for said second seat, and a spring for yieldingly holding said second closure on its seat.

5. The combination with a tubular member provided with means for forming a plurality of spaced closure seats, of a closure for each of said seats, means for yieldingly holding said closures upon their respective seats and means for detachably securing the discharge conduit of a grease gun to one end of said tubular member to force lubricant past said closures.

In witness whereof, I hereunto subscribe my name this 16 day of April, 1919.

ARTHUR V. GULLBORG.

Witnesses:
JOHN L. STEFFEN,
GEO. P. ADAMS.